(12) United States Patent
Wu

(10) Patent No.: US 9,274,242 B2
(45) Date of Patent: Mar. 1, 2016

(54) FRACTURE APERTURE ESTIMATION USING MULTI-AXIAL INDUCTION TOOL

(71) Applicant: Schlumberger Technology Corporation, Sugar Land, TX (US)

(72) Inventor: Peter T. Wu, Missouri City, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 239 days.

(21) Appl. No.: 13/784,153

(22) Filed: Mar. 4, 2013

(65) Prior Publication Data

US 2013/0335092 A1 Dec. 19, 2013

Related U.S. Application Data

(60) Provisional application No. 61/661,415, filed on Jun. 19, 2012.

(51) Int. Cl.
*G01V 3/28* (2006.01)

(52) U.S. Cl.
CPC .................................... *G01V 3/28* (2013.01)

(58) Field of Classification Search
CPC ............. G01V 3/28; G01V 3/30; G01V 3/38; G01V 3/26; G01V 3/34; G01V 3/08; G01V 3/10; G01V 3/12; G01V 3/18; G01V 3/20; G01V 3/22; G01V 3/24; G01V 3/00
USPC ................. 324/333, 338, 339, 343; 702/11, 7
See application file for complete search history.

(56) References Cited

U.S. PATENT DOCUMENTS

| | | | |
|---|---|---|---|
| 5,960,371 A * | 9/1999 | Saito et al. ....................... 702/11 |
| 6,798,208 B2 | 9/2004 | Omeragic | |
| 6,924,646 B2 | 8/2005 | Omeragic | |
| 6,937,021 B2 | 8/2005 | Rosthal | |
| 2004/0001388 A1 | 1/2004 | Kriegshauser et al. | |
| 2005/0256645 A1 | 11/2005 | Rabinovich et al. | |
| 2009/0119082 A1* | 5/2009 | Fitzpatrick .............. E21B 49/00 703/10 |
| 2009/0192714 A1* | 7/2009 | Xue .......................... G01V 3/28 702/7 |
| 2010/0066560 A1* | 3/2010 | McDaniel et al. ......... 340/854.9 |
| 2010/0191470 A1 | 7/2010 | Tabanou et al. | |

(Continued)

OTHER PUBLICATIONS

International Search Report and Written Opinion for International Application No. PCT/US2013/029029 dated Jun. 24, 2013.

(Continued)

*Primary Examiner* — Tung X Nguyen
*Assistant Examiner* — David Frederiksen
(74) *Attorney, Agent, or Firm* — John Vereb

(57) ABSTRACT

A method for estimating fracture aperture from multi-axial electromagnetic induction measurements made in a wellbore includes determining a fracture indicator and a fracture orientation indicator. The value of the fracture indicator is determined from components of the measurements made transverse to the tool axis. A relationship between the value of the fracture indicator and the fracture aperture for the subsurface formation is determined by estimating the fracture indicator using a plurality of values of fracture aperture and a resistivity of drilling fluid in the wellbore over a background formation with estimated horizontal resistivity and vertical resistivity. The fracture aperture is determined using the determined fracture indicator and the determined relationship.

20 Claims, 12 Drawing Sheets

(56) References Cited

U.S. PATENT DOCUMENTS

2010/0198569 A1    8/2010  Wu et al.
2010/0307741 A1   12/2010  Mosse et al.
2011/0227577 A1*   9/2011  Zhang et al. .................. 324/338
2011/0255370 A1*  10/2011  Hirabayashi ............. G01V 1/42
                                                      367/31
2012/0065889 A1    3/2012  Wu et al.

OTHER PUBLICATIONS

Wu, P., Wang, G., and Barber, T., Efficient hierarchical processing and interpretation of triaxial induction data in formations with changing dip, paper SPE 135442 presented at the SPE Annual Technical Conference and Exhibition, Florence, Italy, Sep. 19-22, 2010.

* cited by examiner

The Triaxial Array

- Orthogonal collocated transmitter and receiver coils
- 9 measured components at each tri-axial spacing $$\begin{bmatrix} Vxx & Vxy & Vxz \\ Vyx & Vyy & Vyz \\ Vzx & Vzy & Vzz \end{bmatrix} - C$$

First subscript - Transmitter orientation
Second subscript - Receiver orientation X and Z are axes of the coordinate system fixed on the borehole Y axis is perpendicular to X and Z in the direction out of the paper (right-hand-rule)

θ and φ are the relative dip and dip azimuth of the formation
decc is the eccenter distance
ψ is the azimuth of eccenter

FRACTURE APERTURE ESTIMATION USING MULTI-AXIAL INDUCTION TOOL

CROSS-REFERENCE TO RELATED APPLICATION

This application claims the benefit of a related U.S. Provisional Patent Application Ser. No. 61/661,415, filed Jun. 19, 2012, entitled "Fracture Aperture Estimation Using Multi-Axial Induction Tool," the disclosure of which is incorporated by reference herein in its entirely.

BACKGROUND

This disclosure relates generally to the field of subsurface formation fracture evaluation. More specifically, the disclosure relates to techniques for evaluating fracture aperture using measurements from multi-axial electromagnetic induction well logging instruments.

A tri-axial electromagnetic induction well logging tool such as one sold under the trademark RT SCANNER, which is a trademark of Schlumberger Technology Corporation, Sugar Land, Tex., measures 9-component apparent conductivity tensors ($\sigma m(i, j, k)$, $i, j = x, y, z$) at a plurality of receiver spacings from a transmitter, wherein each spacing is represented by the index k. FIG. 2 schematically illustrates such a tri-axial tool 10 and the component tensor measurement C. The instrument 10 may include one or more multi-axial electromagnetic transmitters T disposed on the instrument 10, and have one or more multi-axial electromagnetic receivers (usually consisting of a main receiver RM and a balancing or "bucking" receiver RB to attenuate direct induction effects) at one or more axially spaced apart positions along the longitudinal axis z of the tool 10. The RT SCANNER instrument uses triaxial transmitters and receivers, wherein the transmitters and receivers have three, mutually orthogonal coils having magnetic dipole axes oriented along the tool axis z and along two other mutually orthogonal directions shown at x and y. The tool's measurements in the present example may be obtained in the frequency domain by energizing the transmitter T with a continuous wave (CW) having one or more discrete frequencies to enhance the signal-to-noise ratio. However, measurements of the same information content could also be obtained and used from time domain signals through a Fourier decomposition process by energizing the transmitter T with one or more types of transient currents. This is a well-known physics principle of frequency-time duality. Voltages induced in each coil of one of the receivers RM/RB is shown in the tensor C represented by the voltage V with a two letter subscript as explained above representing the axis (x, y or z) of the transmitter coil used and the axis of the receiver coil (x, y or z) used to make the particular voltage measurements. The voltage measurements in tensor C may be processed to obtain the described apparent conductivity tensors. Subsurface formation properties, such as horizontal and vertical conductivities ($\sigma h$, $\sigma v$), relative dip angle ($\theta$) and the dip azimuthal direction ($\Phi$), as well as borehole/tool properties, such as mud conductivity ($\sigma mud$), wellbore diameter (hd), tool eccentering distance (decc), tool eccentering azimuthal angle ($\psi$), all affect the measurements of voltages used to determine the conductivity tensors.

FIG. 3A illustrates a top view, and FIG. 3B shows an oblique view of an eccentered tool 10 in a wellbore 12 through an anisotropic formation F with a non-zero dip angle ($\theta$). Eccentering of the tool 10 is shown by decc and the azimuthal angle of the dip azimuth is represented by $\phi$. The tool 10 eccentering azimuthal angle is shown by $\psi$. The above description is to provide a frame of reference to understand an example method according to the present disclosure.

Using a simplified model of layered anisotropic formation traversed obliquely by the wellbore 12, the response of the conductivity tensors depends on the above eight parameters in a very complicated manner. The effects of the wellbore and instrument orientation and position to the measured conductivity tensors may be very large even in oil base mud (OBM) environment. Through an inversion technique the above wellbore and formation parameters can be calculated and the borehole effects can be removed from the measured conductivity tensors.

The formation parameters (vertical and horizontal conductivities, dip and dip azimuth) may be displayed substantially in real-time (as computer by a processor near the wellbore, see FIG. 1A and FIG. 1B) to help make various decisions related to the drilling and completion of the well in a given field. The resistivites (the inverse of conductivities) of the subsurface formations determinable by a tool such as illustrated in FIG. 2 are known in the art to be used, for example, to delineate low resistivity laminated hydrocarbon bearing formations. The dip and dip azimuth are known to be used to map the structure of the formations in a scale much finer than that provided by, e.g., surface reflection seismic. One of the important items of information that may affect the drilling and completion decisions of any particular wellbore is whether the wellbore has traversed significant fracture zones. Fractures occur in the formation due to the tectonic force over the past geological time. Fractures could also be induced by the drilling operation. Large deep fracture systems can sometime be the key factor that allows the production of oil and gas from the pay zone. Large deep fracture system traversed by the borehole could also cause loss of drilling mud. Accordingly, knowing the location of the fracture zone and the fracture plane orientation can significantly improve the drilling and completion decision.

Very thin fractures with large planar extent filled with OBM may block the induced current in the formation resulting from electromagnetic induction effects of energizing the transmitter T on the tool and could produce significant anomalies in the inverted formation parameters compared with those from the same formation without the fractures. The size of such anomalies may depend on the formation resistivity (Rh, Rv), the size of the fracture plane, and the relative dip and azimuth between the fracture plane and the layering structure of the formation, among other things. If the fracture plane is nearly parallel to the layering structure of the formation, the effects of the fracture on measurements made by an instrument such as shown in FIG. 2 may be relatively small. On the other hand, if the fracture plane is perpendicular to the layering structure of the formation, the effect of the fracture may dominate the response of the tool. A fracture system often encountered by wellbores is that of substantially horizontal layered formations with vertical fractures. Accordingly, techniques for characterizing such fractures using multi-axial (e.g., tri-axial) electromagnetic induction measurements may be useful in this regard.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One aspect of the disclosure relates to a method for estimating fracture apertures from multi-axial electromagnetic induction measurements made in a wellbore includes determining a fracture indicator and a fracture orientation indicator. The value of the fracture indicator is determined from components of the measurements made transverse to the tool axis. A relationship between the value of the fracture indicator and the fracture aperture for the subsurface formation is determined by estimating the fracture indicator using a plurality of values of fracture aperture and a resistivity of drilling fluid in the wellbore over a background formation with an estimated horizontal resistivity and vertical resistivity. The fracture aperture is determined using the determined fracture indicator and the determined relationship.

Other aspects and advantages will be apparent from the description and claims which follow.

BRIEF DESCRIPTION OF THE DRAWINGS

Certain embodiments are described below with reference to the following figures.

DETAILED DESCRIPTION

Figure 1A:
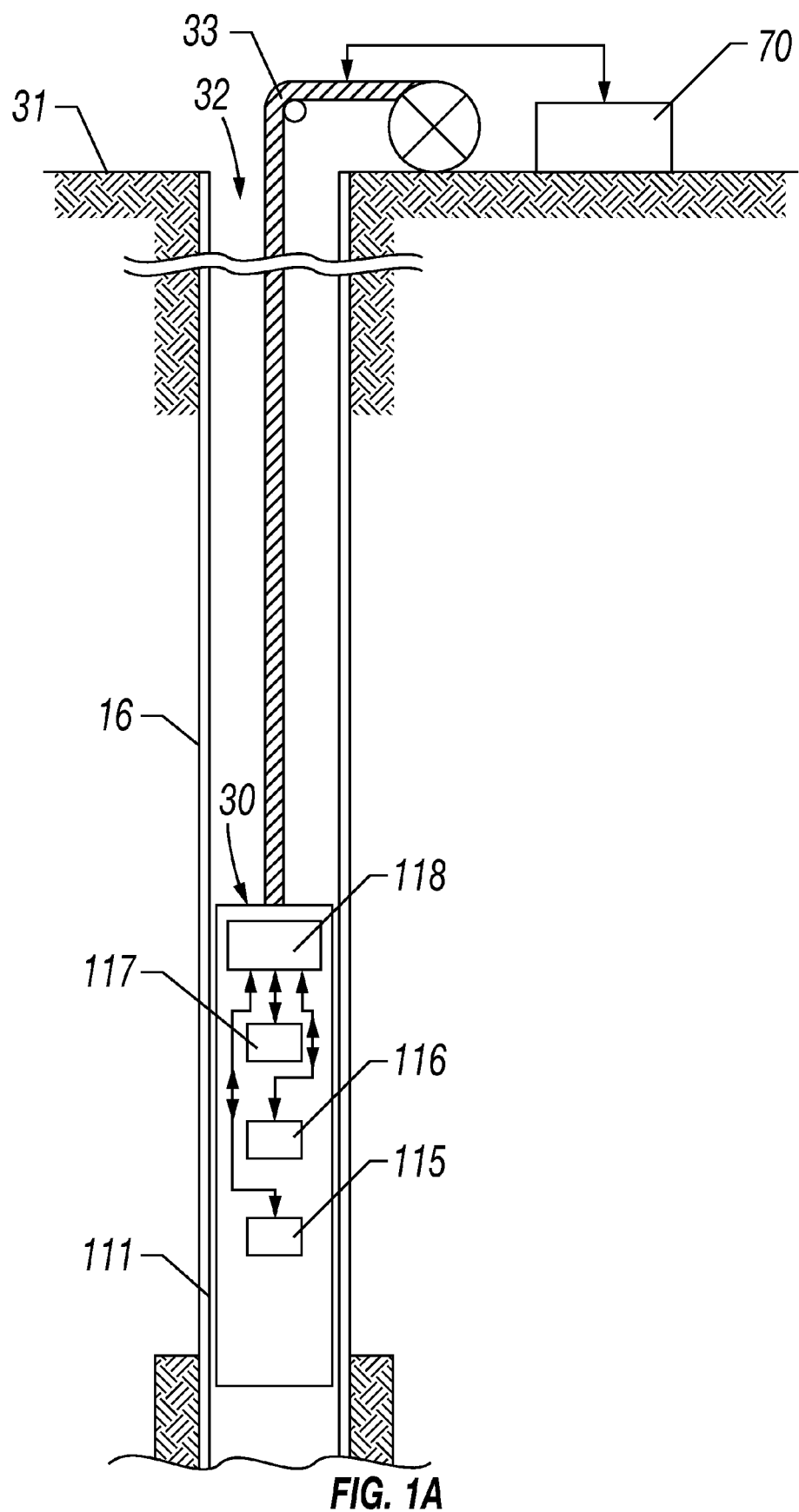
FIG. 1A shows an example wireline conveyed multi-axial electromagnetic well logging instrument disposed in a wellbore drilled through subsurface formations.

FIG. 1 shows an example multi-axial electromagnetic well logging instrument 30. The measurement components of the instrument 30 may be disposed in a housing 111 shaped and sealed to be moved along the interior of a wellbore 32. The well logging instrument 30 may, in a form hereof, be of a type sold under the trademark RT SCANNER, which is a trademark of Schlumberger Technology Corporation, Sugar Land, Tex.

The instrument housing 111 may contain at least one triaxial transmitter 115, and two or more triaxial receivers 116, 117 at different axial spacings from the transmitter 115. The transmitter 115, when activated, may emit a continuous wave electromagnetic field at one or more selected frequencies. Shielding (not shown) may be applied over the transmitter 115 and the receivers 116, 117 to protect the antenna coils which are deployed near the outer layer of the tool. The detectors 116, 117 may be multi-axis wire coils each coupled to a respective receiver circuit (not shown separately). Thus, detected electromagnetic energy may also be characterized at each of a plurality of distances from the transmitter 115.

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the detectors 116, 117 may be processed by suitable circuitry 118 for transmission along the cable 33 to the recording system 70. The recording system 70 may include a computer as will be explained below for analysis of the detected signals as well as devices for recording the signals communicated along the cable 33 from the instrument 30 with respect to depth and/or time.

The well logging tool described above can also be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

Figure 1B:
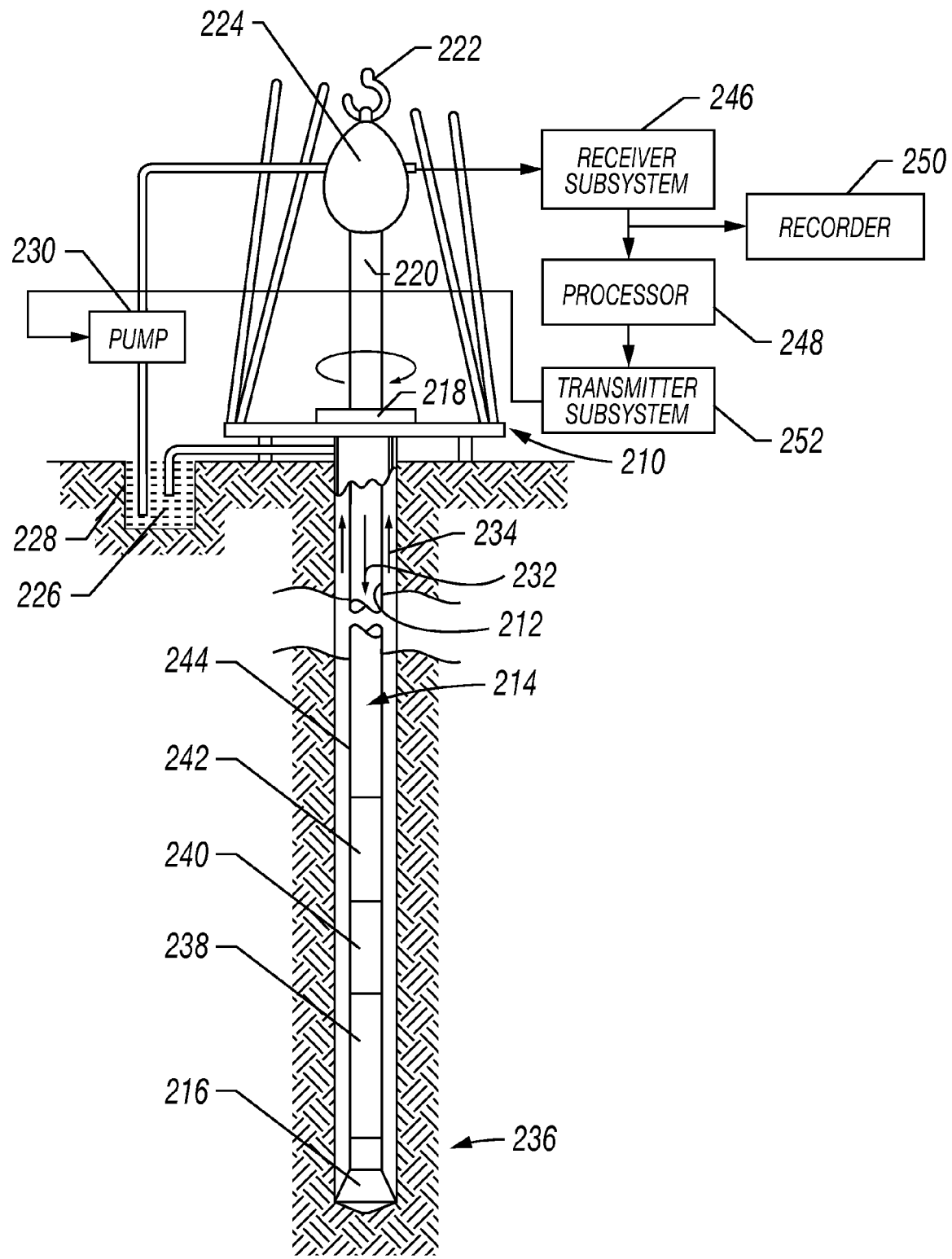
FIG. 1B shows an example well logging instrument system that may be used during wellbore drilling.

In the arrangement shown in FIG. 1B, the components of multi-axial induction well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the drill string. Power for the LWD instrumentation may be provided by battery or, as known in the art, by a turbine generator disposed in the BHA 236 and powered by the flow of drilling fluid.

Figure 2:
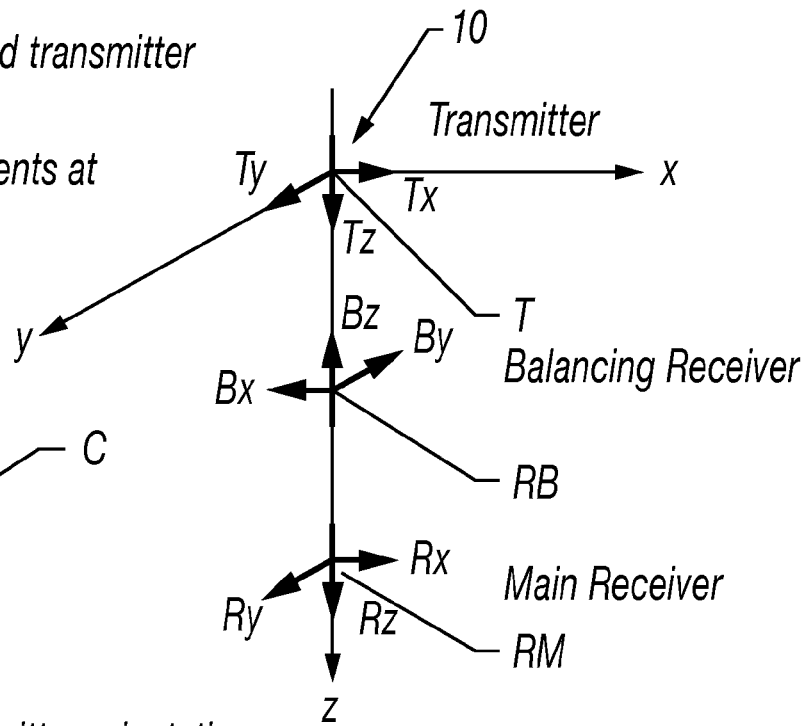
FIG. 2 shows an illustration of a multi-axial (e.g., triaxial) induction array measurement devices (transmitter and receivers) at a given spacing between the transmitter and each receiver.

While the description that follows is based on measurements made from a tool such as the RT SCANNER tool described with reference to FIG. 2 in which each of the transmitter and receivers comprises three, mutually orthogonal induction coils with one coil being aligned with the tool's longitudinal axis, it is to be understood that for purposes of defining the scope of the disclosure, any induction well logging instrument with multi-axial transmitter(s) and receiver(s) having magnetic dipole axes along other directions and in other than three magnetic dipole axis elements (e.g., coils) per transmitter or receiver may be used provided that for each such transmitter and receiver it is possible to resolve three mutually orthogonal components of the transmitted electromagnetic field and the received electromagnetic field and where such resolved components are susceptible to either or both mechanical (physically embodied) or mathematical rotation to any selected coordinate system, e.g., Cartesian or cylindrical.

Figure 4:
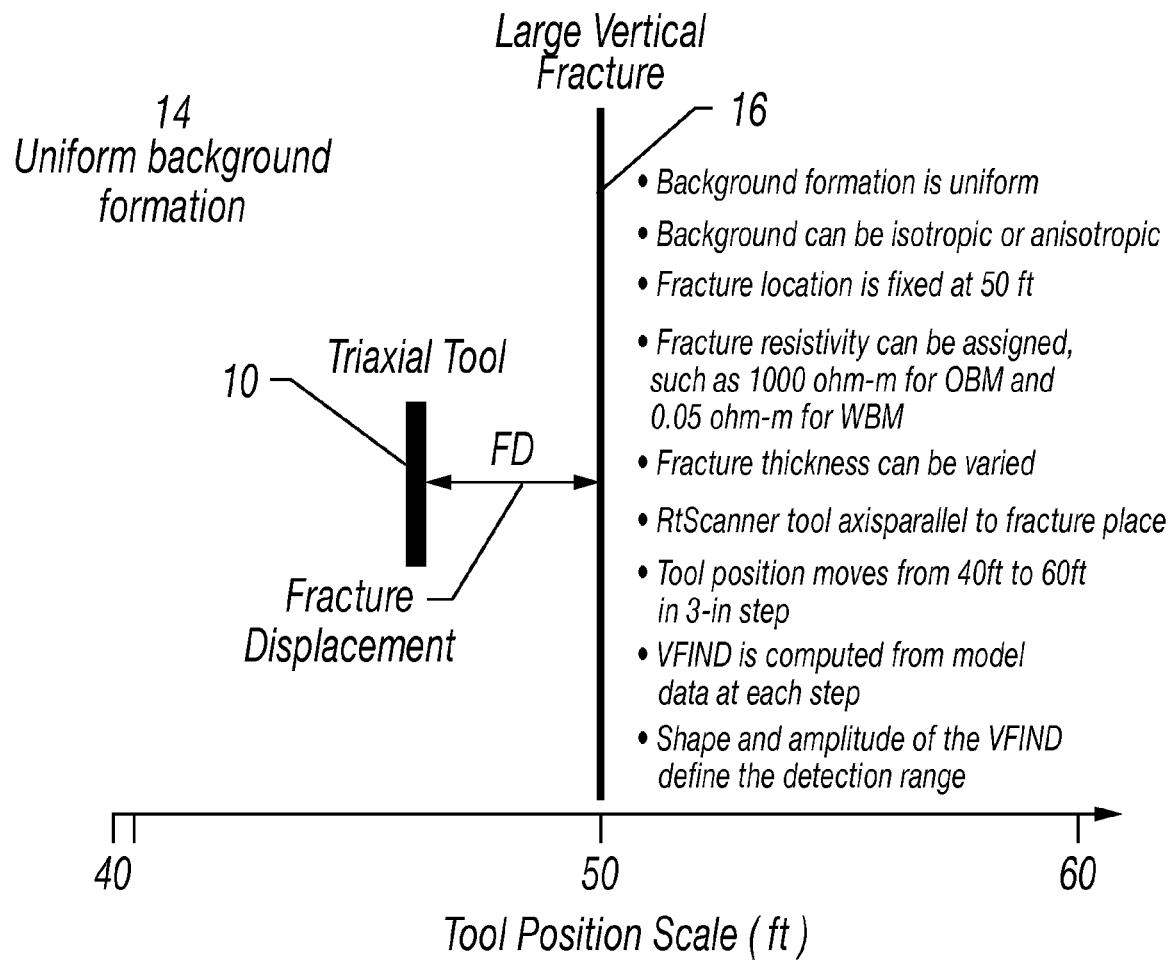
FIG. 4 shows schematically a configuration of a fracture model and a triaxial induction well logging tool.

FIG. 4 is a schematic of a fracture model and the multi-axial induction logging tool 10. The background formation 14 in the model may be assumed to be uniformly anisotropic. Here, isotropic formations are considered as a subset of anisotropic formations for which the horizontal and vertical resistivities have equal value (Rh=Rv). The fracture plane 16 is assumed to be much larger than the tool 10. The tool's axis is assumed to be parallel to the fracture plane 16, and perpendicular to the bedding plane of the formation 14. The distance between the instrument's longitudinal axis and the fracture plane is called fracture displacement (FD). The model configuration in FIG. 4 is intended to investigate the detection range of a fracture and the response of the tool 10 to vertical fractures. The detection range is the maximum FD within which the instrument can still detect the existence of the fracture 16. The fracture aperture (thickness), background formation resistivity, and the resistivity of the fracture 16 can be varied as model parameters. For a given set of model parameter values, the modeled multi-axial signal data from a range of instrument longitudinal positions from 40 to 60 ft with 3-inch axial increments may be computed while the fracture plane 16 is disposed 50 feet from the tool 10. The following computation can be performed for each triaxial array with different transmitter-to-receiver spacings.

The modeled induction signal data may then be processed to compute the following indicators:

$$\text{FOI} = 0.5 * \tan^{-1}[(2*\sigma_{45} - (\sigma xx + \sigma yy))/((\sigma yy - \sigma xx)] \quad (1)$$

$$V\text{FIND} = \text{ABS}(0.5 * (\sigma yy - \sigma xx)/[\delta + \cos(2*\text{FOI})]) \quad (2)$$

In the above expressions, $\sigma_{45}$ is the $\sigma xx$ component of the measured apparent conductivity tensor, $\sigma_a$, rotated 45 degrees around the z-axis (the longitudinal axis of the tool 10). The subscripts xx and yy for each of the above conductivity tensors indicate that the measurements from each receiver array include the x transmitter component (oriented transversely to the longitudinal or z axis of the instrument) and the x receiver component; and the respective y transmitter and receiver components (oriented in the same plane as the x components, but orthogonal to the x axis). The rotated conductivity tensor, $\sigma_{ar}$, is given by the following expression.

$$\sigma_{ar} = R\sigma_a R^T, \sigma_a = \begin{bmatrix} \sigma_{xx} \sigma_{yx} \sigma_{zx} \\ \sigma_{xy} \sigma_{yy} \sigma_{zy} \\ \sigma_{xz} \sigma_{yz} \sigma_{zz} \end{bmatrix}, \quad (3)$$

$$R = \begin{bmatrix} \cos(\varphi) & \sin(\varphi) & 0 \\ -\sin(\varphi) & \cos(\varphi) & 0 \\ 0 & 0 & 1 \end{bmatrix}$$

The $\delta$ in Eq. (2) is a very small constant for the purpose of preventing the denominator in Eq. (2) from being zero. ABS( ) in Eq. (2) is the function symbol for the absolute value of the parameters within the parentheses.

It should be noted that simulations performed to verify the effectiveness of the present example method were conducted such that the longitudinal axis of the instrument was transverse to the bedding plane of the subsurface formations. It will be appreciated by those skilled in the art that the actual orientation of the bedding planes with respect to the tool axis is related to the formation dip and the wellbore inclination from vertical. The conductivity tensors shown in Eq. (3) may be mathematically rotated to provide effective conductivity tensors parallel to the bedding planes in two orthogonal directions and perpendicular to the bedding planes. The measurements used to determine fracture orientation and fracture indicator are effectively parallel to the bedding planes.

FOI in Eq. (1) is the fracture orientation indicator. It indicates the strike (azimuth) direction of the fracture. VFIND in equation (2) is vertical fracture indicator. VFIND is related to the following parameters:
FA—fracture aperture
FD—fracture displacement
FW—fracture width
FH—fracture height
Rh—formation horizontal resistivity
Rv—formation vertical resistivity
Dip—the dip angle of the formation anisotropy For particular values of Rh, Rv, and Dip, VFIND may be used as an indicator of the size of the fracture (FW×FH), FA, and FD. The foregoing expressions were tested by simulation as will be explained with reference to FIGS. 5 through 8.

Figure 3A:
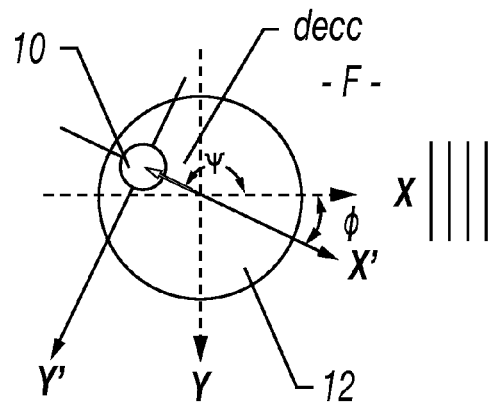
FIG. 3A shows schematically a top view of an eccentered multi-axial induction tool in a wellbore passing through an anisotropic formation at a relative dip angle.
Figure 3B:
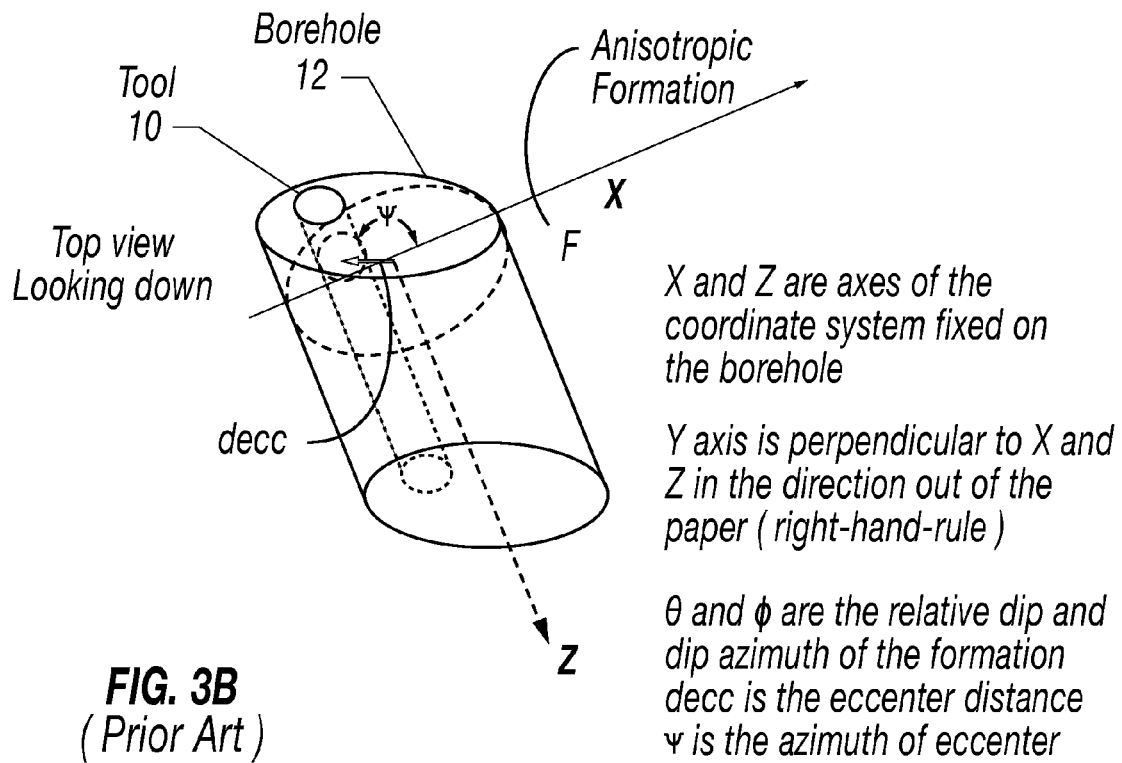
FIG. 3B shows an oblique view of the eccentered tool shown in FIG. 3A.
Figure 3C:
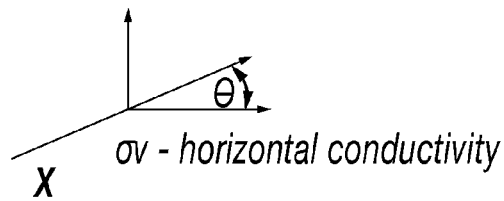
FIG. 3C shows vertical and horizontal conductivity determinable with the tool of FIGS. 3A and 3B with reference to a dip angle between formation layering and a wellbore (and corresponding tool) longitudinal axis.
Figure 5:
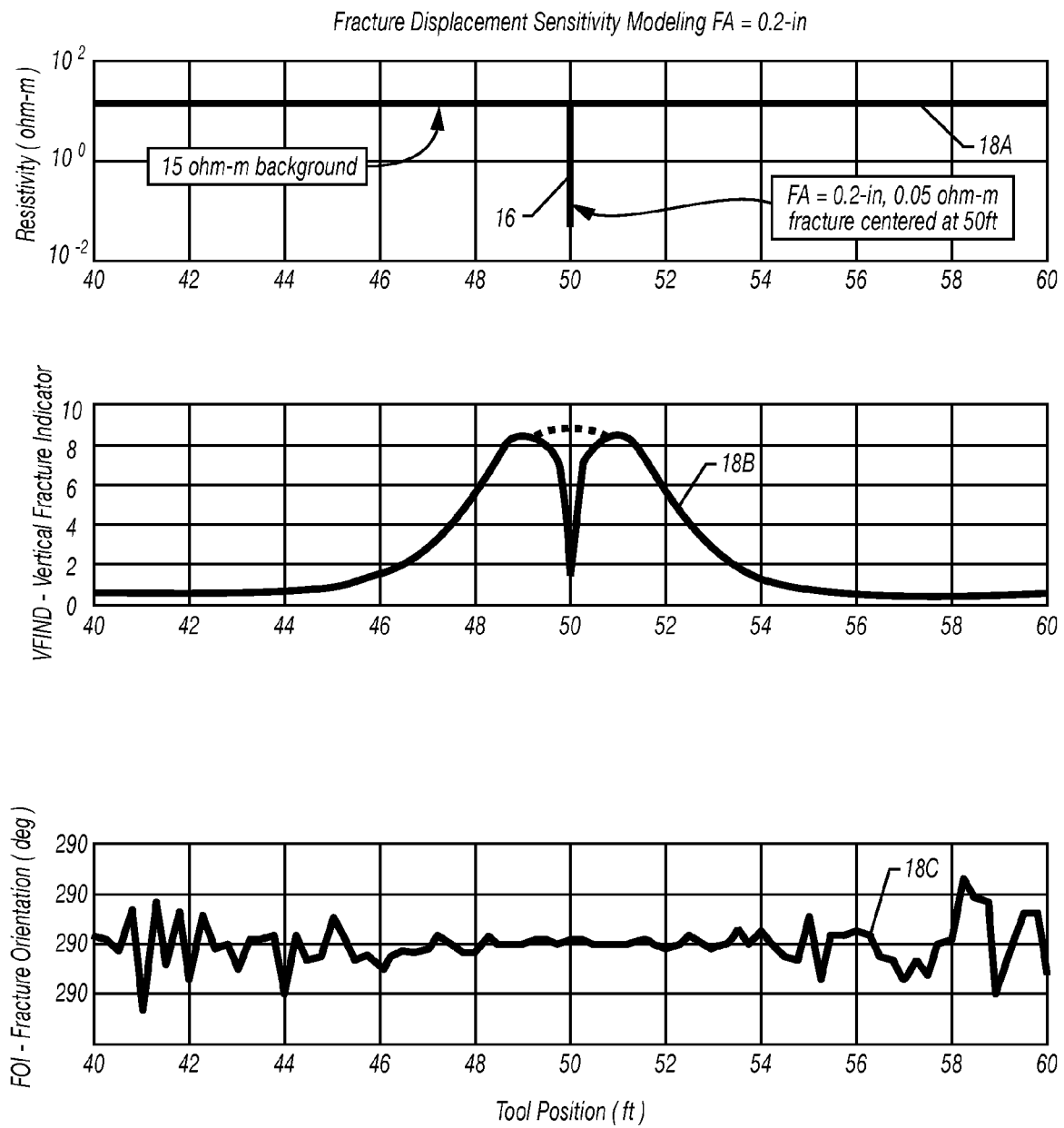
FIG. 5 shows graphs of a fracture indicator for a vertical fracture of 0.2" aperture in a 15 ohm-m isotropic background formation. The fracture strike (azimuth) is 290 deg. The fracture plane is centered at 50 ft. The top plot is model resistivity, the middle plot is the fracture indicator (VFIND), and the lower plot is the fracture orientation (FOI).
Figure 6:
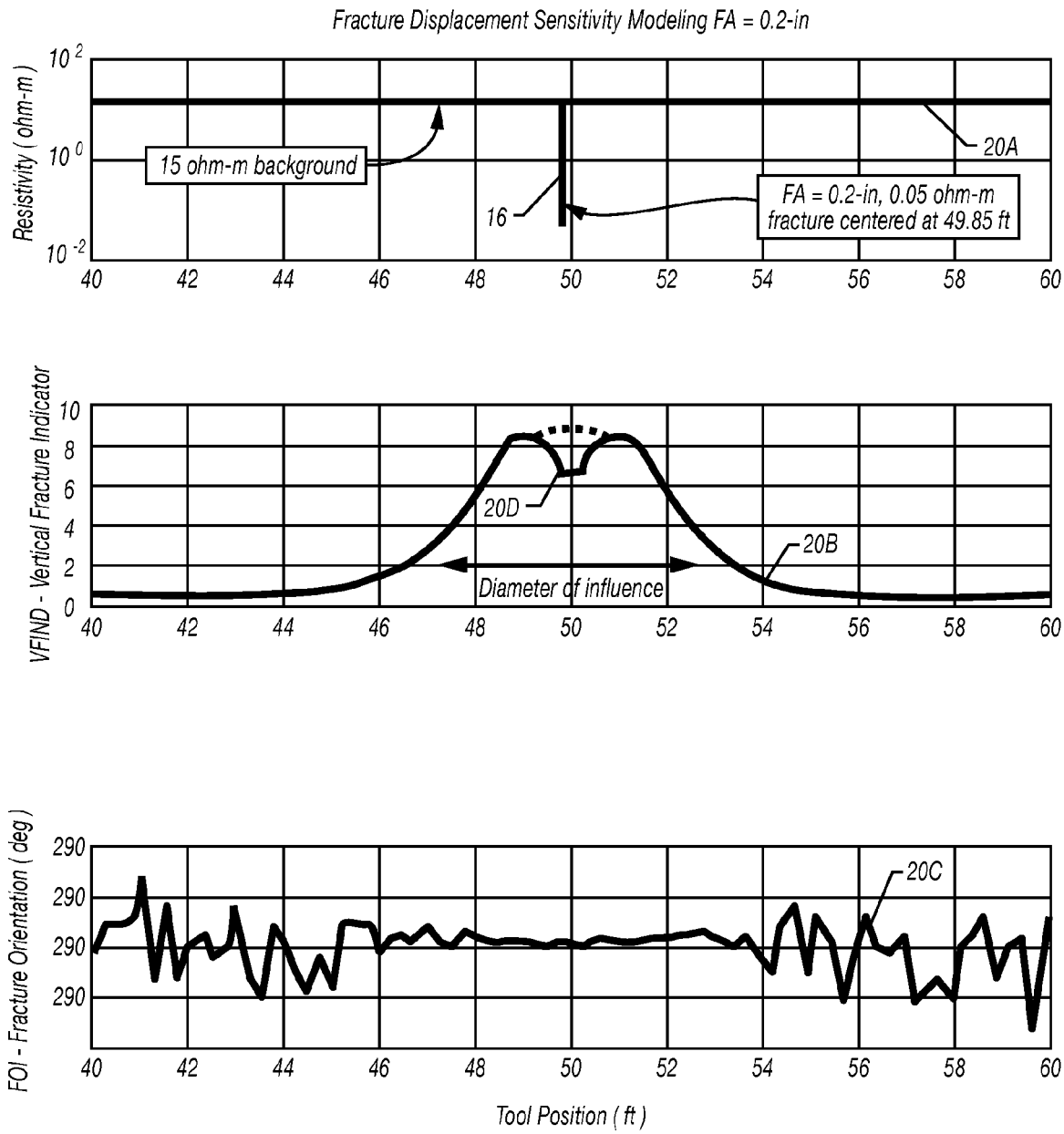
FIG. 6 shows graphs of a fracture indicator for a vertical fracture of 0.2" aperture in a 15 ohm-m isotropic background formation. The fracture azimuth is 290 deg. The fracture plane is centered at 49.85 ft. The top plot is the model resistivity, the middle plot is the fracture indicator (VFIND), and the lower plot is the fracture orientation (FOI).

FIG. 5 shows an example of VFIND computed from model data for a case with Rh=Rv=15 ohm-m as the background formation, 0.05 ohm-m fracture resistivity and with an aperture of 0.2 inch. The fracture strike (azimuth) is 290 deg. The top plot 18A is the modeled resistivity. The middle plot 18B is the computed fracture indicator (VFIND), and the lower plot 18C is the computed fracture orientation (FOI). The horizontal axis represents the well logging instrument's axial position. The fracture 16 is located at a simulated "depth" (axial) position of 50 feet. As the well logging tool moves from the left side (40 ft) of the graph, approaching the fracture 16, VFIND increases gradually. One would expect the VFIND to have a bell shape which peaks at the fracture location as the dotted curve. However, the modeling results indicate a sharp tough where VFIND drops almost to zero at the fracture location. This is because in the response simulation a simplified model of a point dipole to represent the transmitter and receivers of the instrument was used without modeling the presence of a wellbore (e.g., 12 in FIG. 3A). The theoretical point dipole placed at the exact center of a thin, conductive fracture layer would produce phenomena such as guided waves, etc., which would be much less prominent had the modeled instrument been of a finite size of, e.g., 3~4 inch diameter coils and had been disposed within a wellbore. To illustrate this point, FIG. 6 shows the results of a similar simulation at curves 20A, 20B and 20C to that shown in FIG. 5, but with the fracture 16 location shifted to the left by 0.15 in. such that no measurement point falls exactly at the center of the fracture. The sharp trough is thereby reduced greatly as shown at 20D. Such a sharp trough was not observed in other finite difference modeling of fractures with finite size coils and with a borehole, nor was it observed in real well logging data obtained from wellbores passed through confirmed vertical natural fractures. Based on these observations, it may be assumed that VFIND obtained from actual wellbore data would follow the general bell shape as illustrated by the dashed line in the center plot of FIG. 6 which excludes the sharp trough, e.g., at 20D.

Figure 7:
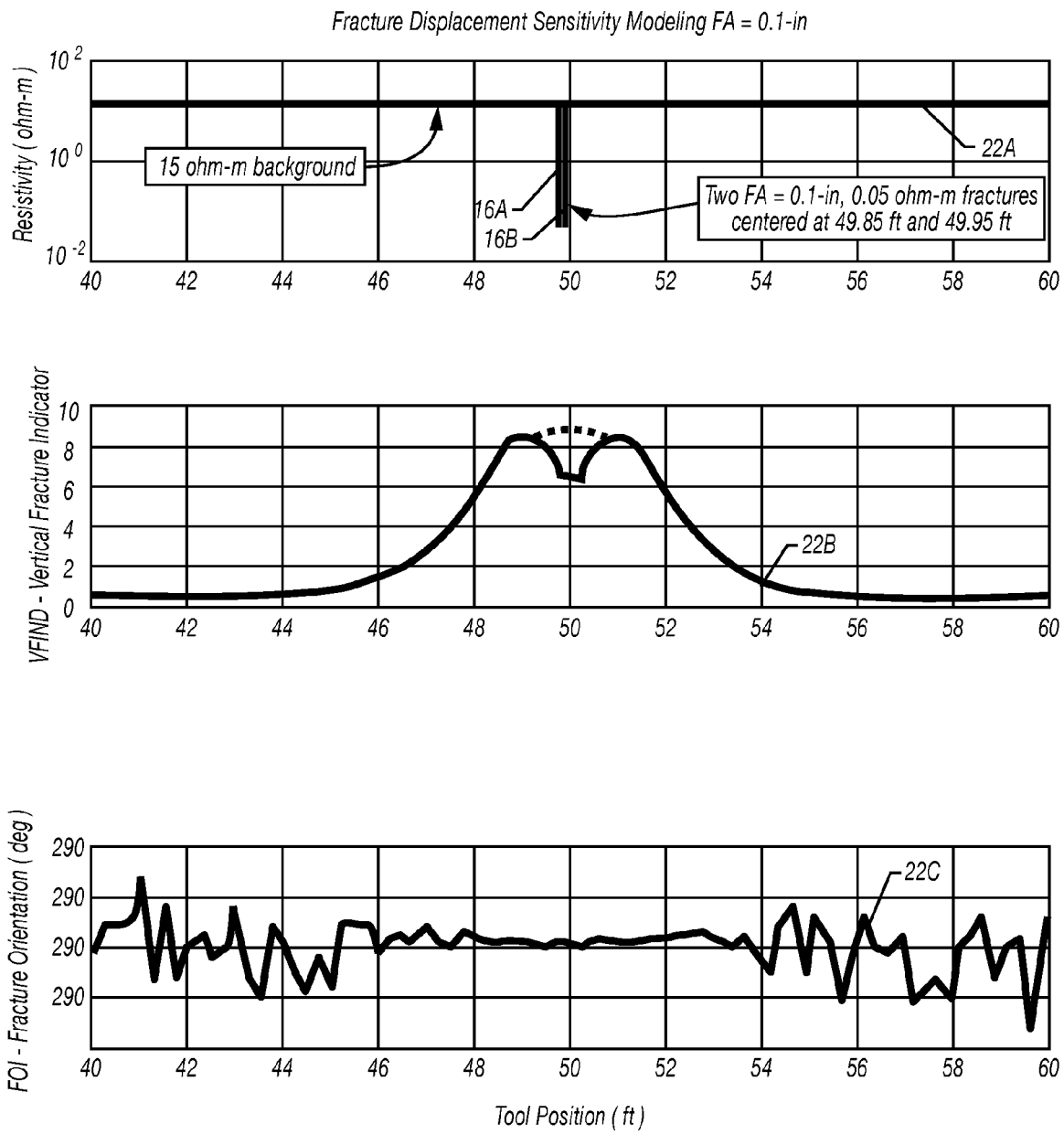
FIG. 7 shows graphs of a fracture indicator for two vertical fractures of 0.1" aperture each in a 15 ohm-m isotropic background formations. The fracture strike (azimuth) is 290 deg. The fracture planes are centered at 49.85 ft and 49.95 ft. The top plot is the model resistivity, the middle plot is the fracture indicator (VFIND), and the lower plot is the fracture orientation (FOI).

FIG. 7 shows VFIND for the case of two vertical 16A, 16B fractures of 0.1" aperture in a 15 ohm-m isotropic background formation at curves 22A, 22B and 22C corresponding to the curves in FIG. 5. Both fractures have the same strike of 290 deg. The fracture planes are centered at 49.85 ft and 49.95 ft. The VFIND in FIG. 7 is almost identical to that in FIG. 6 for the case of one fracture of but doubling the aperture width (0.2"). It appears that VFIND responds to the total fracture conductivity within the volume of rock centered between the transmitter and receiver and produces an averaged response for all the fractures within this averaging volume. Two 0.1" apertures have the same effect as one 0.2" fracture if the FD of these fracture are relatively close to each other.

Figure 8:
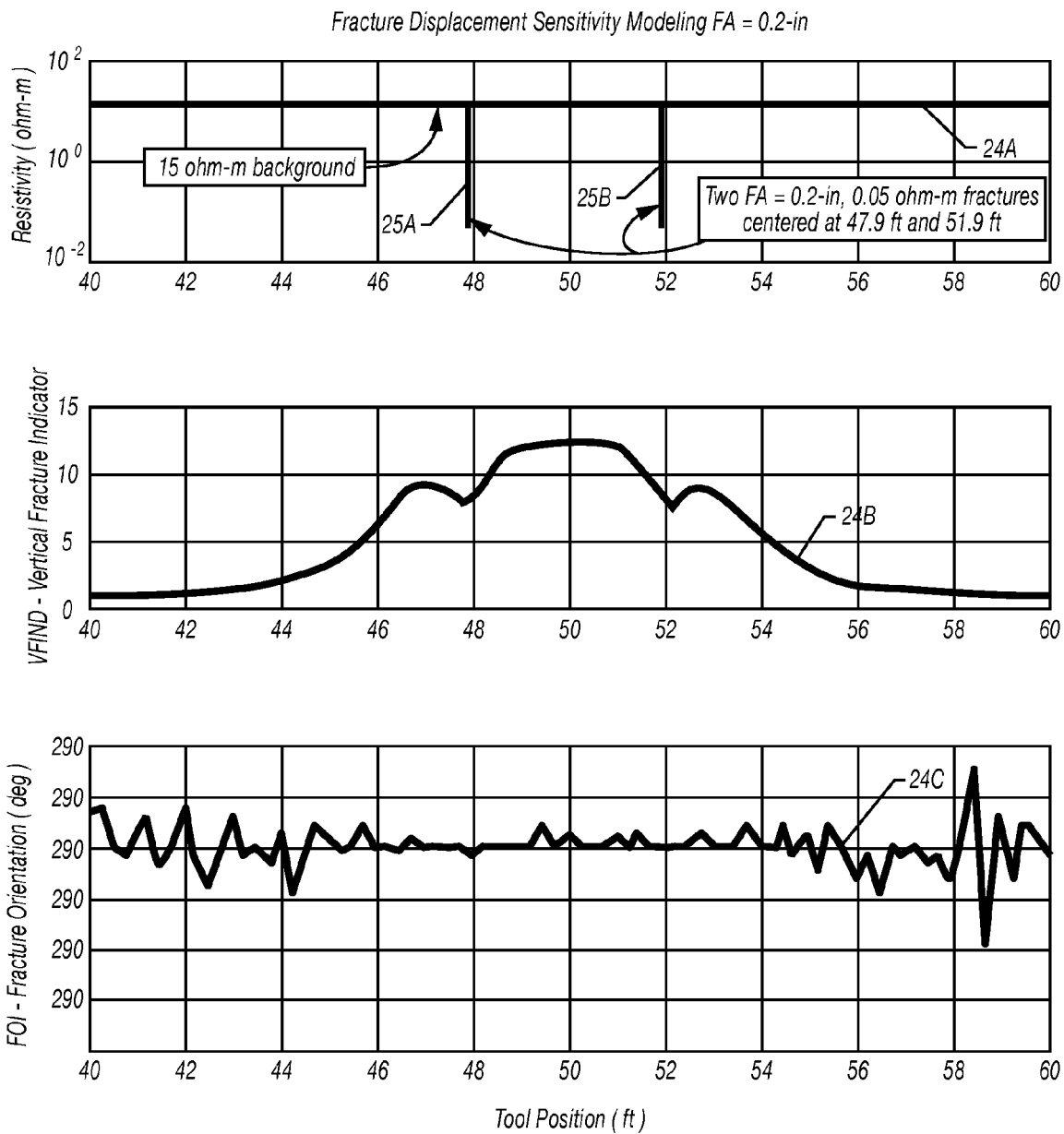
FIG. 8 shows graphs of a fracture indicator for two vertical fractures of 0.2" aperture in a 15 ohm-m isotropic background formation. The fracture strike is 290 deg. The fracture planes are centered at 47.9 ft and 51.9 ft. The top plot is the model resistivity, the middle plot is fracture indicator (VFIND), and the lower plot is the fracture orientation (FOI).

In addition to the fracture conductivity, the fracture displacement (FD) will have an effect on how each fracture in the influence sphere will be averaged into VFIND. For example, the VFIND curve in FIG. 6 could be interpreted as the weighting function through which the fractures within the investigative volume of the instrument will be summed up to obtained an overall VFIND. At FD=2 feet, (i.e. at tool position 48 or 52), the contribution of a 0.05 ohm-m and FA=0.2" fracture to VFIND is 6. Therefore, one may expect that if two such fractures exist around the borehole within the investigative volume, say one fracture at about 48 feet and the other about 52 feet, the VFIND measured at an instrument position of 50 feet will be around 12. FIG. 8 shows the VFIND, at corresponding curves 24A, 24B, 24C of such a model and indeed the VFIND is about 12 at 50 feet instrument position, wherein two fractures 25A, 25B are shown spaced about two feet apart in opposite directions from the 50 foot axial position. Near an instrument axial position 47 feet and 53 feet, the VFIND, curve 24B, shows two local peaks with values of about 8.5, which match the VFIND value in FIG. 6 for the case of only one fracture.

The foregoing modeling examples demonstrated that, to a first order approximation, VFIND can be interpreted as a quantity contributed to by a weighted linear combination of all fracture conductivity within the investigative volume of the well logging instrument. The weighting function depends on FD, the background formation resistivity and the resistivity contrast between the background formation and the fracture. The weighting function may generally have a bell shape with a peak centered at the tool as in the example shown in FIG. 6. If VFIND can be interpreted as qualitatively proportional to all the fracture conductivity within the influence volume, we can further relate VFIND to an effective fracture aperture (FA) through modeling like that described with reference to FIG. 4.

Using 15 ohm-m isotropic formation as the background and 0.05 ohm-m as the fracture resistivity, a series of models were generated to model the VFIND over the fracture as function of FA, wherein FA ranged from 0.01 inches to 2 inches. The VFIND versus FA relation is shown at curve 26 in FIG. 9. In the log-log domain (i.e., logarithmic scales for both axes in the graph), the relationship appears to be substantially linear. VFIND as function of FA may be used to convert the measured VFIND to effective FA through interpolation. The effective FA thus obtained represents the equivalent fracture aperture of the fracture system around the wellbore near the instrument in a weighted average sense. Two small aperture fractures (FA=0.1") crossing the wellbore may have the equivalent fracture aperture of a large fracture (FA=0.2") as illustrated in FIGS. 6 and 7. A fracture with given aperture but far away from the wellbore (larger FD) will have a smaller equivalent FA than a fracture having a similar aperture but located closer to the wellbore (smaller FD). For example, a fracture with FA=0.2" located 2 feet away from the wellbore (see FIG. 6) will have a VFIND of 6. Using the transform curve in FIG. 9, VFIND of 6 is transformed into an effective FA of 0.16". Two fractures of FA=0.2 located 2 feet away from the wellbore (see FIG. 8) will have a VFIND of 12 which will transformed into an effective FA of 0.25".

The VFIND of the model in FIG. 6 indicates that the volume of investigation for fractures around the wellbore under such model conditions (background resistivity and fracture resistivity) has a diameter of about 6 ft. or 72 inches. For fractures outside of this volume, the instrument may have a diminished response to the fracture. For fractures inside this volume, fractures closer to the wellbore have higher response than those located further away. After obtaining the effective fracture aperture of the fracture system around the borehole, one may also estimate the effective fracture porosity by dividing the effective fracture volume (aperture*diameter of investigation*h) by the volume of investigation (h*π*radius of investigation**2) to obtain a percentage ratio. Here the h is the common height of fracture and cylindrical volume of investigation around the borehole. For example, a 0.2 inch effective fracture aperture with diameter of investigation of 72 inches yields 0.2*72/(π*36*36)=0.35% effective fracture porosity.

Figure 10:
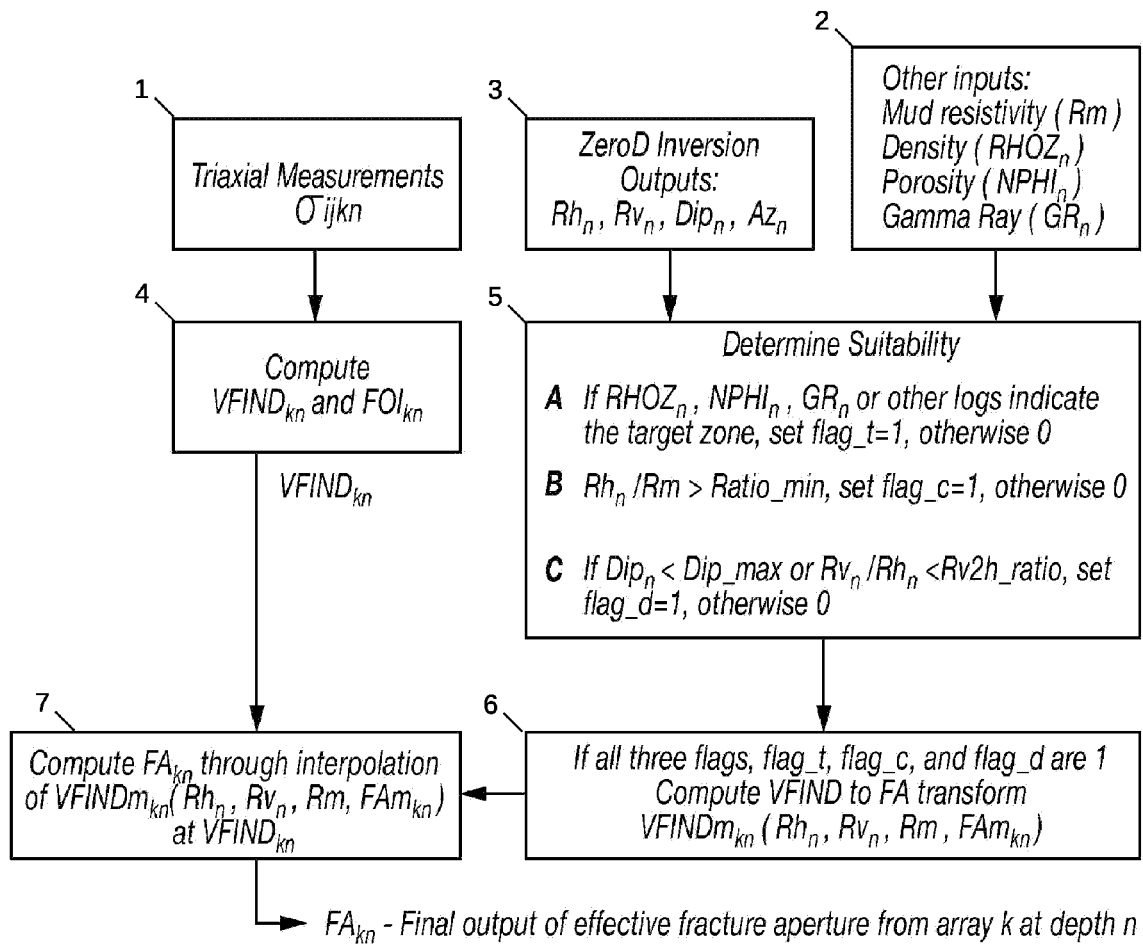
FIG. 10 shows a flow chart for determining effective fracture aperture from multi-axial induction data.

FIG. 10 shows a flow chart of an example method to obtain effective fracture aperture from multi-axial electromagnetic induction measurements. The process may be performed point-by-point fashion at each data depth frame of the data recorded in the recording unit (70 in FIG. 1), which may be on the order of three inches (7.62 cm). At 1 the main input is the measured multi-axial conductivity tensor. The first two indices i, j, represent the x, y, z orthogonal coordinate system. The third index, k represents the receiver array spacing from the transmitter. The last index, n, represents the depth.

The induction data may be processed first at 3 by a zero-D model inversion to obtain background formation information. By way of example only, one type of zero-D inversion algorithm is described in Wu, P., Wang, G., and Barber, T., *Efficient hierarchical processing and interpretation of triaxial induction data in formations with changing dip*, paper SPE 135442 presented at the SPE Annual Technical Conference and Exhibition, Florence, Italy, Sep. 19-22, 2010. The zero-D inversion may output, at each depth index n, formation horizontal resistivity, vertical resistivity, dip angle, and dip azimuth ($Rh_n$, $Rv_n$, $Dip_n$, and $Az_n$).

The formation background resistivity and dip information from 3 together with other log information from 2 may be entered at 5 to determine the zones suitable for running the effective fracture aperture computation. Other log information that may be entered at 2 may include, but are not limited to drilling fluid ("mud") resistivity (Rm), formation density (RHOZ), formation neutron porosity (NPHI) and formation natural gamma ray emission (GR).

There are three principles to determine the zones of suitability for running the effective fracture aperture computation. First, the target zones for running such processing may be generally dictated by petrophysical applications such as tight gas, shale gas, coal seam methane, low primary permeability carbonate reservoir. The goal of all these applications is to identify zones of high fracture permeability. Therefore, it may be useful to run the process only in the above target zones to enhance the relative difference between zones by the comparison of effective fracture aperture only in similar environment and lithology. For example, for coal seam methane applications, one can define the coal zones by some simple criterion such as:

If (RHOZ<2.0 and NPHI>0.4), flag_t=1, otherwise 0, wherein flag_t is the target flag, as shown at A in block 5.

The second principle is that sufficient resistivity contrast between the fractures and the background is needed for fracture detection. Further, for resistive fractures within a conductive background, the VFIND is rather insensitive to fracture aperture. Therefore, in order to obtain a reasonably accurate fracture aperture computation, we need to set a criterion for a contrast flag, flag_c, to signify zones of good contrast. The contrast flag may be defined as:

If ($Rh_n$/Rm>Ratio_min), set flag_c=1, otherwise 0, as shown at B in block 5.

Ratio_min in the above expression is a control parameter with a typical value set at 15 or higher. Zones with $Rh_n$/Rm>Ratio_min will generally satisfy the condition of conductive fractures within a resistive background with sufficient contrast. This condition usually occurs using conductive water based drilling mud within higher resistivity formations, for example, Rm=0.05 ohm-m and Rh>10 ohm-m. The higher the foregoing contrast, $Rh_n$/Rm, the better the signal-to-noise ratio for detection and also better sensitivity of the FA estimation.

The third principle is that the formation structural dip needs to be low in order to detect near vertical fractures accurately. Highly dipping anisotropic formations tend to produce high VFIND also. Therefore, high dip anisotropic formation zones may cause false positive VFIND for fracture detection. A dip flag, flag_d, could be defined to indicate the low dip zones in the following manner:

If (Dip<Dip_max .or. Rv/Rh<Rv2h_ratio), set flag_d=1, otherwise 0, as shown at C in block 5.

In the foregoing expression, the Dip_max and Rvh_ratio are control parameter with typical values set at 30 degree and 1.5, respectively. Rv2h_ratio is the minimum Rv/Rh ratio below which the formation is nearly isotropic for purposes of fracture detection. In the above criterion, one may omit the checking of the dip when the formation is nearly isotropic. This is because that in a nearly isotropic formation, the dip is not well defined with respect to electromagnetic induction response, which in turn causes the dip from zero-D inversion to have a large uncertainty. In nearly isotropic formations, the amplitude of VFIND is mainly contributed by the fracture and not the formation. The false positive problem stated earlier for high dip anisotropic formations will not exist in nearly isotropic formation and therefore it is believed unneeded to check the dip.

Figure 9:
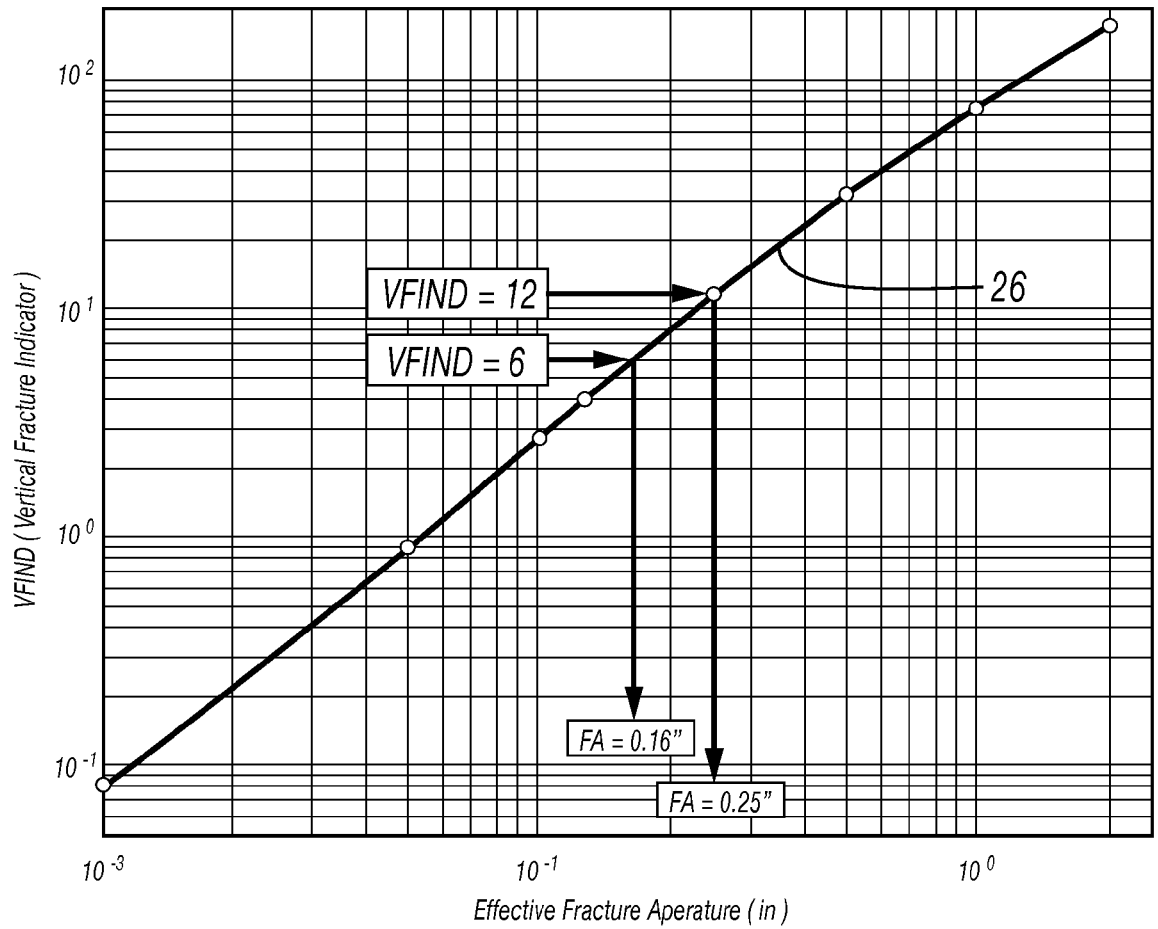
FIG. 9 is a graph of the value of VFIND as function of effective FA for 15 ohm-m isotropic background and 0.05 ohm-m fracture resistivity.

At 6 in FIG. 10, all three flags created at 5, background resistivity information from 3, and mud resistivity from 2 may be used to compute a model based VFIND to FA transform curves for each receiver spacing k. The parameters used in the computation include the background resistivities Rh and Rv, fracture resistivity, Rm and fracture aperture FA. For a given receiver spacing (k), the computation may be repeated for a plurality of FA values covering a possible range of realistic fracture apertures. The example $VFINDm_{kn}(Rh_n,Rv_n,Rm,FAm_{kn})$ curve shown in FIG. 9 is such a transform curve using 72-in array (k=6), Rh=Rv=15 ohm-m, Rm=0.05 ohm-m and FAm grid is [0.01, 0.05, . . . , 1, 2] inches. These model computations may be performed only in the target zones in which all three flags (flag_t, flag_c, and flag_d) are set to 1, as explained above.

At 4 the triaxial measurements σijkn from 1 are used to compute the VFIND and VOI according to equations (1) through (3). At any given depth index, n, the computation may be performed for each receiver axial spacing from the transmitter (k).

At 7, the $VFIND_{kn}$ computed at 4 and the model VFIND to FA transform curves $VFINDm_{kn}(Rh_n,Rv_n,Rm,FAm_{kn})$ from 6 may be used to compute the effective fracture aperture $FA_{kn}$ corresponding to the calculated $VFIND_{kn}$ through interpolation. FIG. 9, as explained above, illustrates graphically the effective fracture aperture values of 0.16" and 0.25" obtained through interpolation for VFIND values of 6 and 12, respectively.

Figure 11:
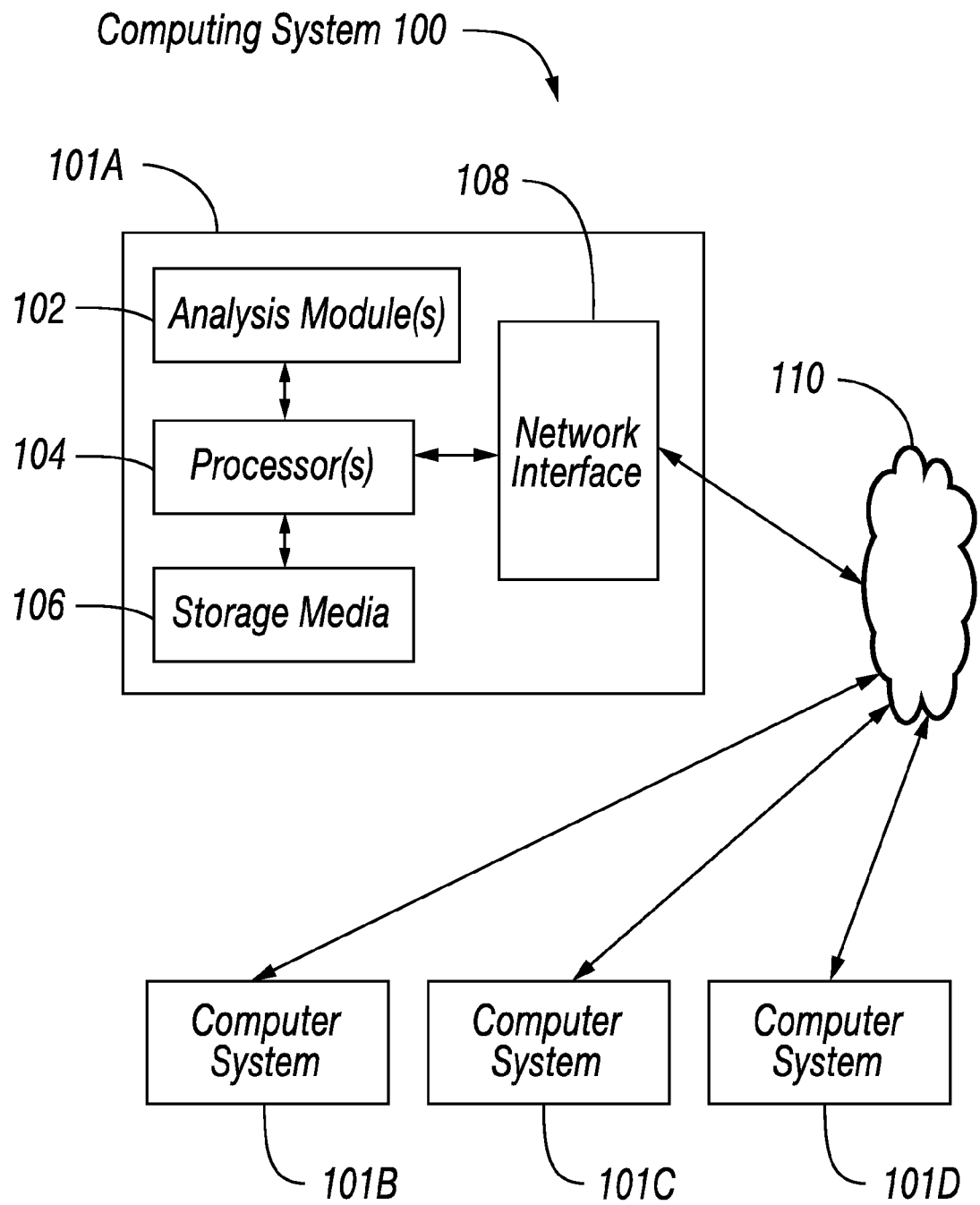
FIG. 11 shows an example computer system.

The foregoing computations may be performed on a computer system such as one shown in the processor at 248 in FIG. 1B, or in the surface unit 70 in FIG. 1A. However, any computer or computers may be used to equal effect. FIG. 11 depicts an example computing system 100 in accordance with some embodiments for carrying out example methods such as those explained above. The computing system 100 can be an individual computer system 101A or an arrangement of distributed computer systems. The computer system 101A includes one or more analysis modules 102 that are configured to perform various tasks according to some embodiments, such as the tasks whose results are depicted in FIGS. 3 through 7. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more non-transitory computer-readable or machine-readable storage media. Note that while in the embodiment of FIG. 11 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 11, and/or computing system 100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining effective fracture aperture from multi-axial electromagnetic induction measurements made by a multi-axial electromagnetic induction tool in a wellbore traversing subsurface formations, comprising using a computer for:
   determining a vertical fracture indicator from components of the multi-axial electromagnetic induction measurements made transverse to a tool axis, wherein the tool axis is substantially transverse to a bedding plane of the subsurface formations;
   determining a vertical fracture indicator to fracture aperture transform for the subsurface formations as a function of the vertical fracture indicator, a horizontal resistivity, a vertical resistivity, and a resistivity of drilling fluid; and
   determining the effective fracture aperture corresponding to the vertical fracture indicator by interpolating the vertical fracture indicator to fracture aperture transform.

2. The method of claim 1 further comprising determining subsurface formations for which the effective fracture aperture is to be determined by determining when at least one of fracture permeability, formation dip and resistivity contrast between the subsurface formation and an associated fracture exceed a respective selected threshold.

3. The method of claim 1 further comprising determining subsurface formation effective fracture porosity using the effective fracture aperture and a fracture response volume of investigation.

4. The method of claim 1 wherein the multi-axial electromagnetic induction measurements are made by energizing at least one triaxial transmitter and detecting voltages in at least one triaxial receiver disposed at a spaced apart location along the tool axis.

5. The method of claim 4 wherein at least one axis of the at least one triaxial transmitter and the at least one triaxial receiver are substantially along a same direction as the tool axis.

6. The method of claim 1 further comprising moving the multi-axial electromagnetic induction tool along the wellbore and repeating the determining the value of a fracture indicator and determining the effective fracture aperture for a plurality of subsurface formations.

7. The method of claim 6 further comprising determining the subsurface formations for which the effective fracture aperture is to be determined by determining when at least one of fracture permeability, formation dip and resistivity contrast between the subsurface formation and an associated fracture exceed a respective selected threshold for the plurality of subsurface formations.

8. The method of claim 6 further comprising determining subsurface formation effective fracture porosity using the effective fracture aperture and a fracture response volume of investigation for the plurality of subsurface formations.

9. A method for well logging, comprising:
moving a multi-axial electromagnetic well logging tool along a wellbore traversing subsurface formations, the multi-axial electromagnetic well logging tool comprising at least one multi-axial electromagnetic transmitter and at least one multi-axial electromagnetic receiver disposed at a spaced apart position along a tool axis of the multi-axial electromagnetic well logging tool;
measuring a multi-component apparent conductivity tensor comprising a measurement of voltage induced in each axial component of the at least one multi-axial electromagnetic receiver resulting from energizing each axial component of the at least one multi-axial electromagnetic transmitter;
using a computing system to determine a vertical fracture indicator from components of the multi-component apparent conductivity tensor made transverse to the tool axis, wherein the tool axis is substantially transverse to a bedding plane of the subsurface formations;
using the computing system to determine a vertical fracture indicator to fracture aperture transform for the subsurface formations as a function of the vertical fracture indicator, a horizontal resistivity, a vertical resistivity, and a resistivity of drilling fluid; and
determining an effective fracture aperture corresponding to the vertical fracture indicator by interpolating the vertical fracture indicator to fracture aperture transform.

10. The method of claim 9 further comprising determining in the computing system subsurface formations for which the effective fracture aperture is to be determined by determining when at least one of fracture permeability, formation dip and resistivity contrast between the subsurface formations and an associated fracture exceed a respective selected threshold.

11. The method of claim 9 further comprising determining in the computing system subsurface formation effective fracture porosity using the effective fracture aperture and a fracture response volume of investigation.

12. The method of claim 9 wherein the at least one multi-axial electromagnetic transmitter comprises a triaxial transmitter and the at least one multi-axial electromagnetic receiver comprises a triaxial receiver disposed at a spaced apart location along the tool axis.

13. The method of claim 12 wherein at least one axis of the triaxial transmitter and the triaxial receiver are substantially along a same direction as the tool axis.

14. The method of claim 9 wherein moving the multi-axial electromagnetic well logging tool comprises extending an armored electrical cable into and/or withdrawing the armored electrical cable out of the wellbore.

15. The method of claim 9 wherein the moving the multi-axial electromagnetic well logging tool comprises moving a drill string including the multi-axial electromagnetic well logging tool along the wellbore.

16. The method of claim 15 wherein the moving the drill string comprises lengthening the wellbore by rotating a drill bit at an end of the drill string.

17. A system comprising:
a multi-axial electromagnetic induction well logging tool comprising at least one multi-axial electromagnetic transmitter and at least one multi-axial electromagnetic receiver disposed at a spaced apart position along a tool axis of the multi-axial electromagnetic induction well logging tool;
a computer comprising a memory device storing instructions and a processor configured to execute the stored instructions to cause the computer to:
acquire a multi-component apparent conductivity tensor as a function of a voltage measurement induced in each axial component of the at least one multi-axial electromagnetic receiver resulting from energizing each axial component of the at least one multi-axial electromagnetic transmitter;
determine a vertical fracture indicator from components of the multi-component apparent conductivity tensor made transverse to the tool axis;
determine a vertical fracture indicator to a fracture aperture transform as a function of the vertical fracture indicator, a horizontal resistivity, a vertical resistivity, and a resistivity of drilling fluid; and
determining an effective fracture aperture corresponding to the vertical fracture indicator by interpolating the vertical fracture indicator to fracture aperture transform.

18. The system of claim 17, wherein the tool axis is substantially transverse to a bedding plane.

19. The system of claim 17, wherein the at least one multi-axial electromagnetic transmitter comprises a triaxial transmitter and the at least one multi-axial electromagnetic receiver comprises a triaxial receiver disposed at a spaced apart location along the tool axis.

20. The system of claim 17, wherein the stored instructions, when executed, further cause the computer to determine subsurface formations for which the effective fracture aperture is to be determined by determining when at least one of fracture permeability, formation dip and resistivity contrast between the subsurface formations and an associated fracture exceed a respective selected threshold.

* * * * *